United States Patent
Jackson

[11] Patent Number: 5,960,444
[45] Date of Patent: *Sep. 28, 1999

[54] SOFTWARE TOOL FOR INDEXING DOCUMENT MADE FROM PLURALITY OF SMALLER DOCUMENTS CREATED USING DIFFERENT VERSIONS OF WORD PROCESSING SOFTWARE

[75] Inventor: Charles P. Jackson, Mountain View, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/674,042

[22] Filed: Jul. 1, 1996

[51] Int. Cl.$^6$ .................................................. G06F 17/30
[52] U.S. Cl. .......................................... 707/203; 707/511
[58] Field of Search ..................................... 395/601, 611, 395/616, 617, 618, 619, 620, 208, 200.47, 209; 707/1, 100, 200, 201, 202, 203, 204, 205, 500; 705/9, 1; 345/517, 326

[56] References Cited

U.S. PATENT DOCUMENTS

| | | |
|---|---|---|
| 4,912,637 | 3/1990 | Sheedy et al. ............................. 395/619 |
| 4,974,149 | 11/1990 | Valenti ................................. 395/200.47 |
| 5,214,755 | 5/1993 | Mason ..................................... 395/782 |
| 5,518,273 | 5/1996 | Olson ........................................ 283/36 |
| 5,524,201 | 6/1996 | Shwarts et al. .......................... 345/326 |
| 5,524,240 | 6/1996 | Barbara et al. .......................... 395/603 |
| 5,548,700 | 8/1996 | Bagley et al. ........................... 707/540 |
| 5,557,515 | 9/1996 | Abbruzzese et al. ....................... 705/9 |
| 5,623,652 | 4/1997 | Vora et al. ............................... 395/610 |
| 5,740,405 | 4/1998 | Degraaf ................................... 395/500 |
| 5,806,078 | 9/1998 | Hug et al. ................................ 707/511 |

*Primary Examiner*—Ruay Lian Ho
*Attorney, Agent, or Firm*—Graham & James LLP

[57] ABSTRACT

A software tool that allows a user to combine a number of smaller documents and then to index the combined documents. A bookfile contains one or more documents, each document containing its own indexing information. The user can drag and drop names of bookfiles into the tool. The invention also compensates for various formats and versions of the documents. A preferred embodiment of the present invention operates on FrameMaker 4.0 documents and can also handle mixed FrameMaker version 3.0 and version 4.0 documents. The software tool combines the documents and generates a master index for all the documents. The software tool also allows the user to specify abbreviations and long titles to use in the index generated for each bookfile.

20 Claims, 20 Drawing Sheets

FIG. 4(a)

| | |
|---|---|
| extracting files from tape | (SUG) 394 |
| Extras menu | (SUG) 138 |
| F | |
| factorial calculator function | (SUG) 325 |
| fakeboot | (OBCR) 84 |
| false | (OBCR) 73, (OBCR) 139 |
| false | (STRN) 219 |
| fastboot | (STRN) 219 |
| fasthalt | (STRN) 206, (STRN) 219 |
| faults reported by vmstat | (SPAA) 128 |
| faults, See printers, faults | |
| FB locking, framebuffer locking | (SDUG) 1-4 |
| fbtest framebuffer test | (SDUG) 6-39 |
| FCode interpreter | (OBCR) 2 |
| FCode programs | (OBCR) 82, (OBCR) 84, (OBCR) 85 |
| fcode-debug? | (OBCR) 24, (OBCR) 117 |
| fdformat | (PA) 57 |
| fdformat | (STRN) 219 |
| fdformat command | |
|   SPARC | (ASP) 27 |
|   x86 | (ASP) 71 |
| fdformat -d command | |
|   SPARC | (ASP) 27 |
|   x86 | (ASP) 72 |
| FDFS file system | (FSA) 6 |
| FDFS pseudo file system | (STRN) 83, (STRN) 86 |
| fdisk command | (ASP) 56 |
| fdisk partitions | (ASP) 57 |
| fdisk profile keyword | (SIS) 83, (SIS) 84, (XIS) 77, (XIS) 78 |
| feature summary | |
|   data link protocol | (TCP) 98 |
| features | |
|   excluded | (STRN) 9 |
|   for the developer | (STRN) 8 |
|   for the system administrator | (STRN) 7 |
|   for the user | (STRN) 6 |
| ff | (STRN) 88 |
| ff command | (FSA) 7 |
| fgrep | (STRN) 219 |
| fiber optic text | (SDUG) 6-7 |

402

408

Solaris 2.4 User's and System Administrator's
Global Index (Key to Abbreviations faces page 1)

FIG. 4(b)

| | | |
|---|---|---|
| field | (OBCR) 60, (OBCR) 132 | |
| FIFO inodes | (FSA) 222 | |
| FIFOFS file system | (FSA) 6 | |
| FIFOFS pseudo file system | (STRN) 83, (STRN) 87 | |
| figure of sample domain | (NSC) 83 | |
| File | (SUG) 368 | |
| file | | |
|    permissions | | |
|       printing | (SAUG) 44 | |
|       saving mail in | (SAUG) 124 | |
|       saving, in Text Editor | (SAUG) 110 to (SAUG) 111 | |
|       searching for | (SUG) 140 | |
|       security | (SAUG) 41 TO (SAUG) 44 | |
|       setting default permissions | (SAUG) 44 to (SAUG) 53 | |
|       viewing | (SAUG) 153 to (SAUG) 154 | |
|          in Text Editor | (SUG) 140 | |
|          saved mail messages | (SUG) 207 | |
|    .cshrc | (SAUG) 146 | |
|    .login | (SAUG) 146 | |
|    .mailrc | (SAUG) 115 | |
|    .profile | (SAUG) 146 | |
|    /etc/aliases | (SAUG) 117 file access | |
|       controlling | (STRN) 219 | |
|       reported by sar | (STRN) 18 | |
|       security of | (SPAA) 48 | |
|    /etc/hosts.equiv | (SAUG) 141, (SAUG) 143 | |
|    /etc/passwd | (SAUG) 141, (SAUG) 143, (SAUG) 145 | |
|    /etc/profile | (SAUG) 146 | |
|    and the diff command | (SAUG) 39 to (SAUG) 41 | |
|    changing permissions | (SAUG) 47 to (SAUG) 49 | |
|    checking type | (SAUG) 32 | |
|    copying | (SAUG) 29 | |
|    copying onto tape | (SUG) 392 | |
|    creating new | (SAUG) 29 | |
|    creating, in Text Editor | (SUG) 139 | |
|    definition of | (SAUG) 27 to (SAUG) 28 | |
|    displaying contents | (SAUG) 31 | |
|    editing, in Text Editor | (SUG) 141 | |
|    extracting from tape | (SUG) 394 | |
|    initialization | (SAUG) 145 to (SAUG) 146 | |
|    inserting in a letter | (SAUG) 109 | |
|    listing invisible | (SAUG) 46 | |

Solaris 2.4 User's and System Administrator's Global Index (Key to Abbreviations faces page 1)

402 Key to Abbreviations

| Abbreviation | Complete Manual Title |
|---|---|
| AARM | Administration Application Reference Manual[1] |
| ASP | Administration Supplement for Solaris Platforms[1] |
| CAT | Common Administration Tasks[1] |
| DXU | Direct Xlib User's Guide[1] |
| FSA | File System Administration[1] |
| NFSA | NFS Administration Guide[1] |
| NIST | NIS+Transition Guide[1] |
| NSA | Name Services Administration Guide[1] |
| NSC | Name Services Configuration Guide[1] |
| OBCR | OpenBoot Command Reference Manual[1] |
| OBQR | OpenBoot Quick Reference[1] |
| PA | Peripherals Administration[1] |
| SAP | Software and AnswerBook Packages Administration Guide[1] |
| SAUG | Solaris Advanced User's Guide[2] |
| SDUG | SunDiag User's Guide[1] |
| SINT | Solaris 2.4 Introduction[2] |
| SIS | SPARC: Installing Solaris Software[1] |
| SPAA | Security, Performance, and Accounting Administration[1] |
| SSB | SunSHIELD Basic Scurity Module Guide[1] |
| STRN | Solaris 1.x to Solaris 2.x Transition Guide[1] |
| SUG | Solaris User's Guide[2] |
| TB | Solaris 2.4 Streams Programming Guide |
| UPM | User Accounts, Printers, and Mail Administration[1] |
| XIS | x86: Installing Solaris Software[1] |

1. From the Solaris 2.4 System Administrator AnswerBook set.
2. From the Solaris 2.4 User AnswerBook set.

FIG. 4(c)

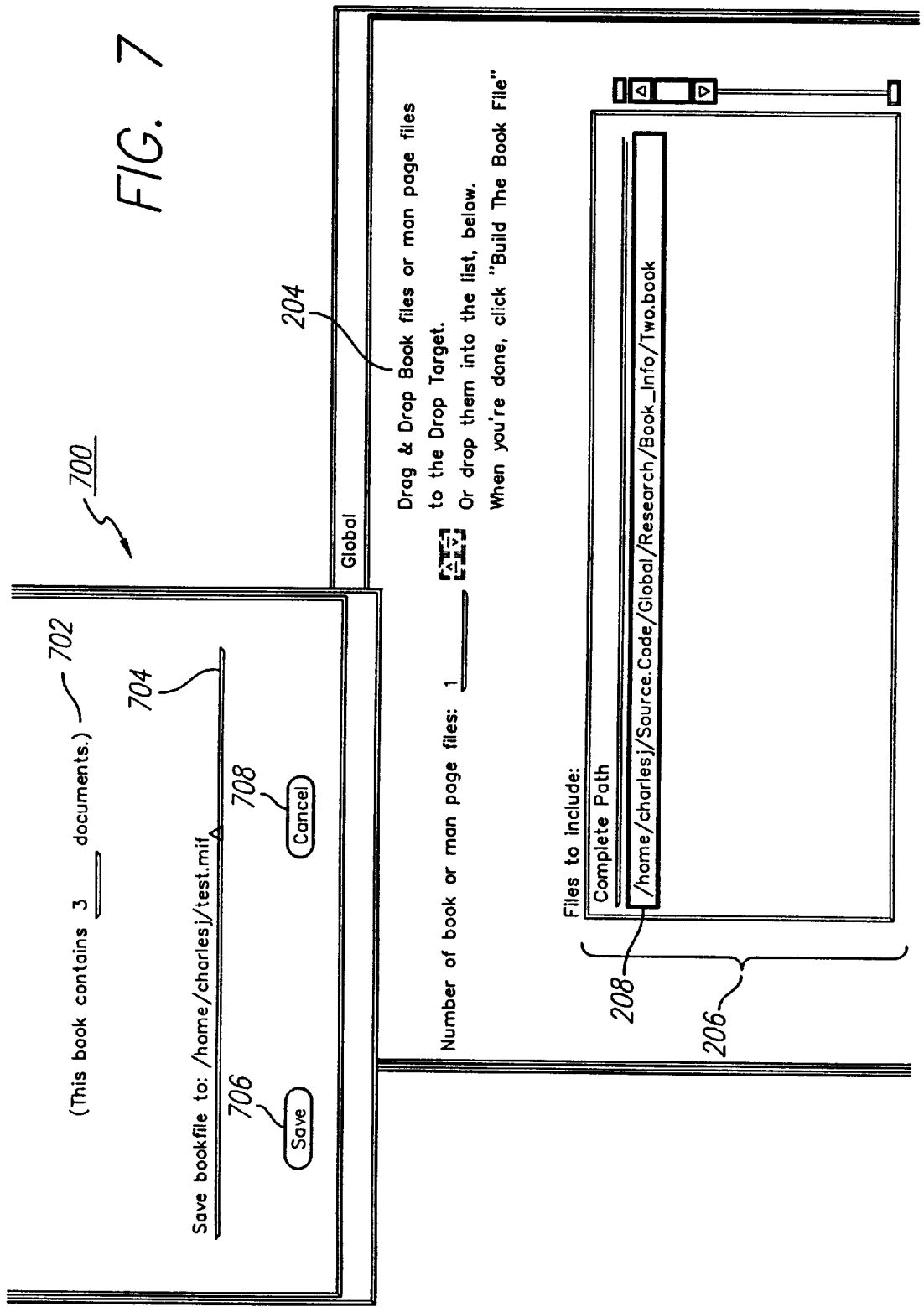

FIG. 11(a)
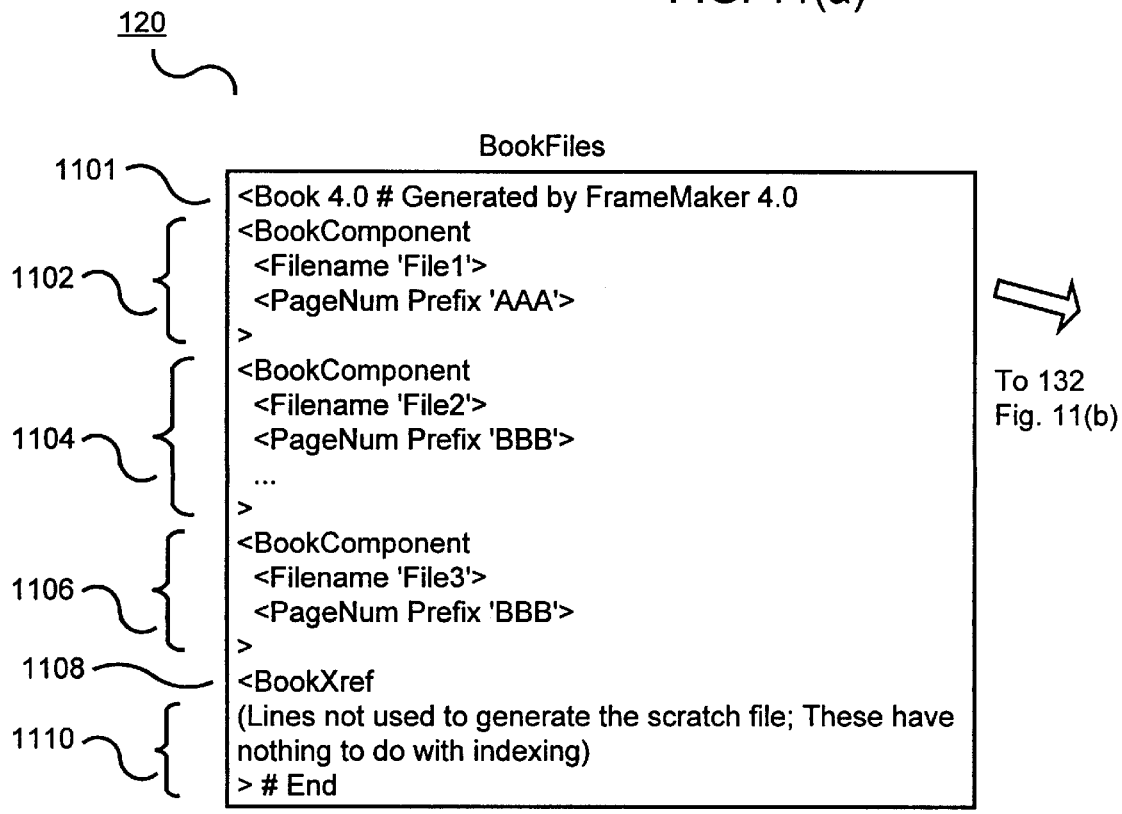
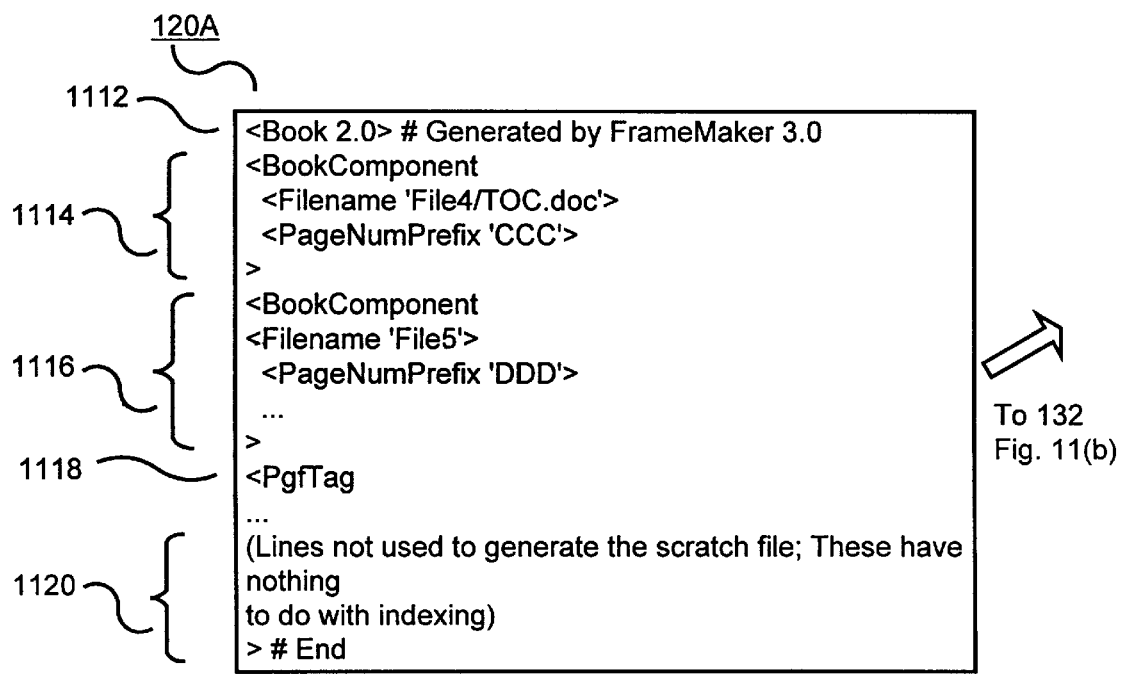

```
/* Write to the temp file (to hold our large bookfile) . */
fprintf (temp_file_ptr, "<Book 4.0> # Generated by FrameMaker xm4.0.1P1d\n");
fprintf (temp_file_ptr, "<BWindowRect 674 120 322 500>\n") ;
fprintf (temp_file_ptr, "</FontCatalog\n") ;
fprintf (temp_file_ptr, "> # end of FontCatalog\n") ;
fprintf (temp_file_ptr, "<PgfCatalog\n") ;
fprintf (temp_file_ptr, "> # end of PgfCatalog\n") ;
fprintf (temp_file_ptr, "<ElementDefCatalog\n") ;
fprintf (temp_file_ptr, "> # end of ElementDefCatalog\n") ;
```

FIG. 12
Initial Material

```
fprintf (temp_file_ptr, "<BookComponent \n") ;
fprintf (temp_file_ptr, "%s\n", file_entry) ;
fprintf (temp_file_ptr, " <DeriveLinks Yes >\n") ;                    ─ 1302
fprintf (temp_file_ptr, " <StartPageSide ReadFrom File >\n") ;
fprintf (temp_file_ptr, " <PageNumbering ReadFromFile >\n") ;
if (docs_in_book == 1)
    fprintf (temp_file_ptr, " <PgfNumbering Restart >\n");      /* Restart for
else                                                               first in series */
    fprintf (temp_file_ptr, " <PgfNumbering Continue >\n");

fprintf (temp_file_ptr, " <PageNumPrefix ' (%s) %s'>\n", abbrev_array [counter,
prefixnames [counter]) ;
fprintf (temp_file_ptr, " <PageNumSuffix ' '>\n") ;
fprintf (temp_file_ptr, " <DefaultPrint Yes >\n") ;
fprintf (temp_file_ptr, " <DefaultApply Yes >\n") ;
fprintf (temp_file_ptr, "> # end of BookComponent\n") ;
```

FIG. 13
Middle Data
(For Each Document/file in a Bookfile)

/* Put in the rest of the back-matter book material */

```
fprintf (temp_file_ptr, "<PgfCatalog \n") ;
fprintf (temp_file_ptr, " <Pgf \n") ;
fprintf (temp_file_ptr, "  <PgfTag 'Body'>\n") '
fprintf (temp_file_ptr,"   <PgfUseNextTag No >\n") ;
fprintf (temp_file_ptr,"   <PgfAlignment Left >\n") ;
fprintf (temp_file_ptr,"   <PgfFIndent 0.0%c>\n", q_mark) ;
fprintf (temp_file_ptr,"   <PgfRIndent 0.0%c>\n", q_mark) ;
fprintf (temp_file_ptr,"   <PgfTopSeparator ">\n") ;
fprintf (temp_file_ptr,"   <PgfBotSeparator ">\n") ;
fprintf (temp_file_ptr,"   <PgfPlacement Anywhere >\n") ;
fprintf (temp_file_ptr,"   <PgfSpBefore  0.0 pt>\n") ;
fprintf (temp_file_ptr,"   <PgfSpAfter  0.0 pt>\n" ;
fprintf (temp_file_ptr,"   <PgfWithPrev No >\n") ;
fprintf (temp_file_ptr,"   <PgfWithNext No >\n") ;
fprintf (temp_file_ptr,"   <PgfBlockSize 1>\n") ;
fprintf (temp_file_ptr,"   <PgfFont\n") ;
fprintf (temp_file_ptr,"    <FTag ">\n") ;
fprintf (temp_file_ptr,"    <FFamily 'Times'>\n") ;
fprintf (temp_file_ptr,"    <FVar 'Regular'>\n" ;
fprintf (temp_file_ptr,"    <FWeight 'Regular'>\n") ;
fprintf (temp_file_ptr,"    <FAngle 'Regular'>\n") ;
fprintf (temp_file_ptr,"    <FSize  12.0 pt>\n") ;
fprintf (temp_file_ptr,"    <FUnderline No >\n") ;
fprintf (temp_file_ptr,"    <FOverline No >\n:) ;
fprintf (temp_file_ptr,"    <FStrike No >\n") ;
fprintf (temp_file_ptr,"    <FSupScript No .\n") ;
fprintf (temp_file_ptr,"    <FSubScript No >\n") ;
fprintf (temp_file_ptr,"    <FChangeBar No >\n") ;
fprintf (temp_file_ptr,"    <FOutline No >\n") ;
fprintf (temp_file_ptr,"    <FShadow No >\n") ;
fprintf (temp_file_ptr,"    <FPairKern Yes >\n") ;
fprintf (temp_file_ptr,"    <FDoubleUnderline No >\n") ;
fprintf (temp_file_ptr,"    <FNumericUnderline No >\n") ;
fprintf (temp_file_ptr,"    <FDX  0.0 pt>\n") ;
fprintf (temp_file_ptr,"    <FDY  0.0 pt>\n") ;
fprintf (temp_file_ptr,"    <FDW  0.0 pt>\n") ;
fprintf (temp_file_ptr,"    <FSeparation 0>\n") ;
fprintf (temp_file_ptr, "   > # end of PgfFont\n") ;
fprintf (temp_file_ptr,"   <PgfLineSpacing Fixed >\n") ;
fprintf (temp_file_ptr,"   <PgfLeading  2.0 pt>\n") ;
fprintf (temp_file_ptr,"   <PgfAutoNum No >\n") ;
```

FIG. 14(a)
Book-Matter
Book Material

```
fprintf (temp_file_ptr,"    <PgfNumTabs 0>\n") ;
fprintf (temp_file_ptr,"    <PgfHyphenate Yes >\n") ;
fprintf (temp_file_ptr,"    <HyphenMaxLines 2>\n") ;
fprintf (temp_file_ptr,"    <HyphenMinPrefix 3>\n") ;
fprintf (temp_file_ptr,"    <HyphenMinSuffix 3>\n"0 ;
fprintf (temp_file_ptr,"    <HyphenMinWord 5>\n") '
fprintf (temp_file_ptr,"    <PgfLetterSpace No >\n") '
fprintf (temp_file_ptr,"    <PgfMinWordspace 90>\n") ;
fprintf (temp_file_ptr,"    <PgfOptWordSpace 100>\n") ;
fprintf (temp_file_ptr,"    <PgfMaxWordSpace 110>\n") ;
fprintf (temp_file_ptr,"    <PgfLanguage USEnglish >\n") ;
fprintf (temp_file_ptr,"    <PgfCellAlignment Top >\n") ;
fprintf (temp_file_ptr,"    <PgfCellMargins  0.0 pt 0.0 pt 0.0 pt 0.0 pt>\n") ;
fprintf (temp_file_ptr,"    <PgfCellLMarginFixed No >\n") ;
fprintf (temp_file_ptr,"    <PgfCellTMarginFixed No >\n") ;
fprintf (temp_file_ptr,"    <PgfCellRMarginFixed No >\n") ;
fprintf (temp_file_ptr,"    <PgfCellBMarginFixed No >\n") ;
fprintf (temp_file_ptr,"  > # end of Pgf\n:) ;
fprintf (temp_file_ptr," > # end of PgfCatalog\n") ;
fprintf (temp_file_ptr," # End of Book\n") ;

/* End of back-matter book material */
```

FIG. 14(b)
Book-Matter
Book Material

<Filename 'mychapter.doc'>

<Filename '<r\><c\>home<c\>charlesj<c\>mychapter.doc'>

| | |
|---|---|
| TB | Solaris 2.4 Streams Programming Guide |
| GDOC | General Documentation |

Map file

SOFTWARE TOOL FOR INDEXING DOCUMENT MADE FROM PLURALITY OF SMALLER DOCUMENTS CREATED USING DIFFERENT VERSIONS OF WORD PROCESSING SOFTWARE

FIELD OF THE INVENTION

This application relates to the field of document production and, in particular, to a software tool for indexing a document made from several smaller documents.

BACKGROUND OF THE INVENTION

The advent of word processing software has made life easier for people who write and edit documents. In addition to making it easy to move and change the text of the document, some conventional word processing software programs have built-in features that automatically generate codes within the text so that the document can be automatically indexed via an "index" command. On the other hand, some conventional word processing software generates documents that are composed of several smaller documents. It is inconvenient to have to individually specify the indexing command for each of the smaller documents in order to index an entire document. For example, a set of manuals written for a new release of an operating system may include between three hundred and six hundred individual documents. Using conventional indexing software, the names of each of these documents would have to be typed in by hand.

In addition, the documents may be stored in various formats and versions generated by the word processing software. Consequently, some of the documents must be converted to a newer format or version before they can be indexed.

SUMMARY OF THE INVENTION

The present invention overcomes the problems and disadvantages of the prior art by providing a software tool that allows a user to combine "book files" that reference a number of smaller documents and that then allows the user to index the combined document. The present invention writes predetermined information and information from the bookfiles to a "master bookfile" and then indexes the master bookfile using a single indexing command.

The invention also compensates for differences in various formats and versions in which the documents are stored. A preferred embodiment of the present invention operates on Framemaker 4.0 documents and also can handle mixed Framemaker version 3.0 and version 4.0 documents. "Framemaker" is a registered trademark of Frame Technology Corporation.

In accordance with the purpose of the invention, as embodied and broadly described herein the invention is a software tool for global indexing a bookfile, where the bookfile references a plurality of documents and the bookfile is stored in accordance with either a first version or a second version, comprising: an input portion configured to receive the name of the bookfile from the user; an initial portion configured to write initial material to a master bookfile, specifying that the master bookfile is the second version; a middle portion configured to write material to the master bookfile for each document in accordance with the version of the bookfile; an ending portion configured to write back-matter book material to the master bookfile; and a indexing portion configured to index the master bookfile to generate a global index page.

In further accordance with the purpose of this invention, as embodied and broadly described herein the invention is a method for globally indexing a bookfile, where the bookfile references a plurality of documents and the bookfile is stored in accordance with either a first version or a second version, comprising the steps, performed by a data processing system, of: receiving the name of the bookfile from the user; writing initial material to a master bookfile, specifying that the master bookfile is the second version; writing middle material to the master bookfile for each document in accordance with the version of the bookfile; writing back-matter book material to the master bookfile; and indexing the master bookfile to generate a global index page.

Advantages of the invention will be set forth in part in the description which follows and in part will be obvious from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings which are incorporated in and constitute a part of this specification, illustrate several embodiments of the invention and, together with the description, serve to explain the principles of the invention.

FIGS. 4(*a*) and 4(*b*) show an example of an index page generated using a preferred embodiment of the present invention.

FIG. 4(*c*) shows an example of an abbreviation key page generated using a preferred embodiment of the present invention.

FIG. 7 shows a window of the software tool that allows the user to enter a file name of the master bookfile.

FIG. 11 (*b*) shows an example of the master bookfiles.

FIG. 12 shows an example of computer code to generate "initial material" written into the master bookfile by the global indexing software tool.

FIG. 13 shows an example of computer code to generate material written into the master bookfile by the global indexing software tool for each document in a bookfile.

FIGS. 14 (a) and 14 (b) show an example of computer code to generate "back-matter book material" written into the master bookfile by the global indexing software tool.

DETAILED DESCRIPTION OF THE PREFERRED EMBODIMENT

Reference will now be made in detail to a preferred embodiment of the invention, an example of which is illustrated in the accompanying drawings. Wherever possible, the same reference numbers will be used throughout the drawings to refer to the same or like parts.

Figure 1:
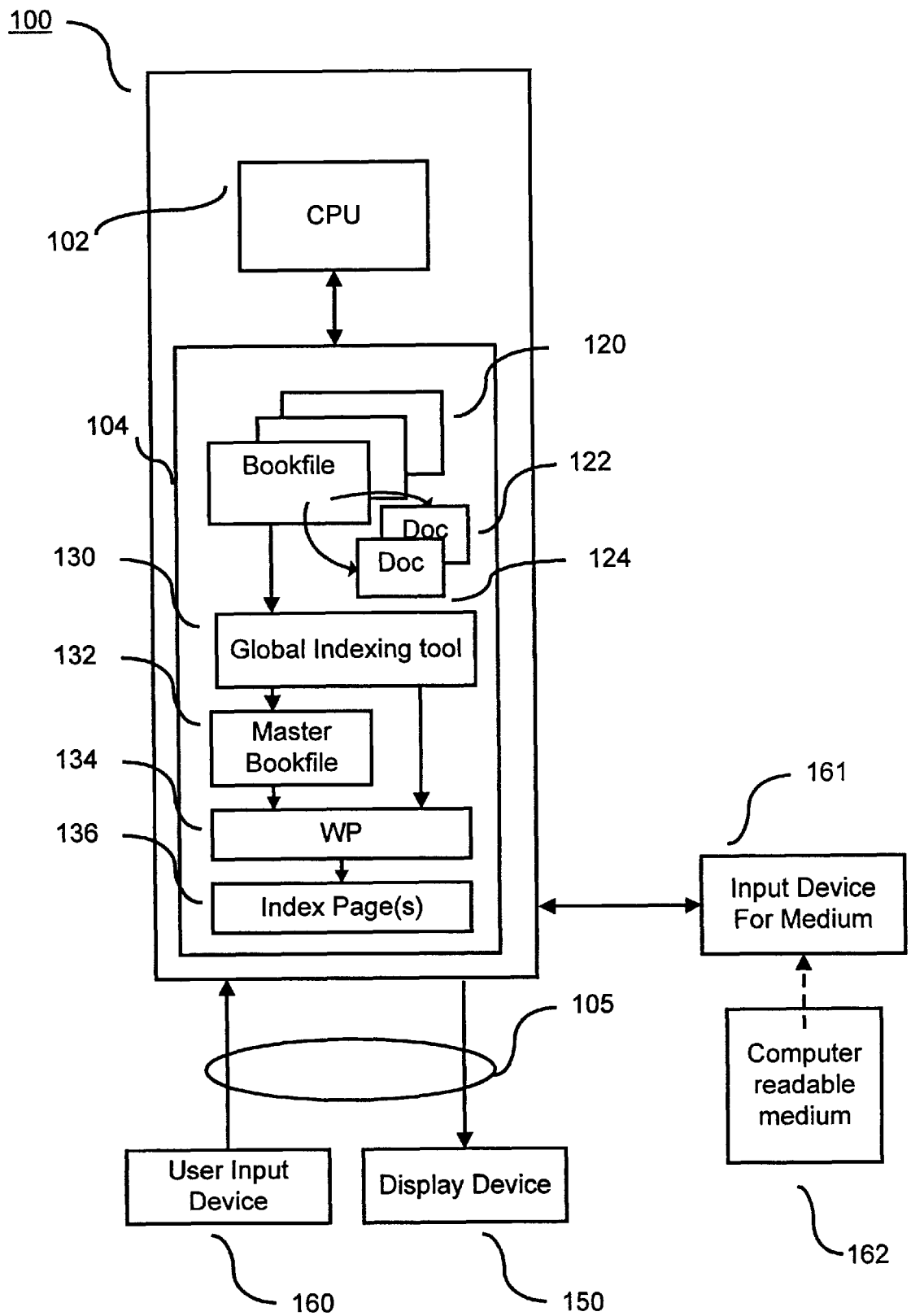
FIG. 1 is a block diagram of a computer system in accordance with a preferred embodiment of the present invention.

FIG. 1 is a block diagram of a computer system 100 in accordance with a preferred embodiment of the present invention. Computer system 100 includes a CPU 102; a memory 104; input/output lines 105; a user input device 160, such as a keyboard or mouse; and a display device 150, such as a display terminal. Computer system 100 further includes an input device 161 for reading a computer usable medium 162 having computer readable program code means embodied therein. Input device 161 is, for example, a disk drive or CD ROM drive. Computer usable medium 162 is, for example, a floppy disk or a CD ROM.

Memory 104 of first computer 110 includes a plurality of "bookfiles" 120. A bookfile may represent, for example, a manual or a group of consecutively numbered chapters of a document. Each bookfile references one or more smaller documents, such as documents 122, 124. Documents 122, 124 are considered to be part of the bookfile 120 in which they are referenced. In the described embodiment, bookfiles 120 were created using one or more versions of word processing software (WP) 134. Bookfiles 120 may be stored in accordance with multiple versions and/or formats generated by WP 134.

Memory 104 also includes a global indexing tool 130 (which is described below in detail), a master bookfile 132, and an index page 136. In a preferred embodiment, WP 134 is the FrameMaker word processor, available from Frame Technology Corp. Software tool 130 operates on indexes in bookfiles 120 previously generated by FrameMaker. Each of these bookfiles can have a version/format of either FrameMaker 3.0 or FrameMaker 4.0.

A person of ordinary skill in the art will understand that memory 104 also contains additional information, such as application programs, operating systems, data, etc., which are not shown in the figure for the sake of clarity. It will be understood by persons of ordinary skill in the art that computer system 100 can also include numerous elements not shown in the Figure for the sake of clarity, such is additional disk drives, keyboards, display devices, network connections, additional memory, additional CPUs, LANs, input/output lines, etc. A preferred embodiment of the invention runs under the Solaris operating system, Version 2.3 or later. Solaris is a registered trademark of Sun Microsystems, Inc.

Figure 2:
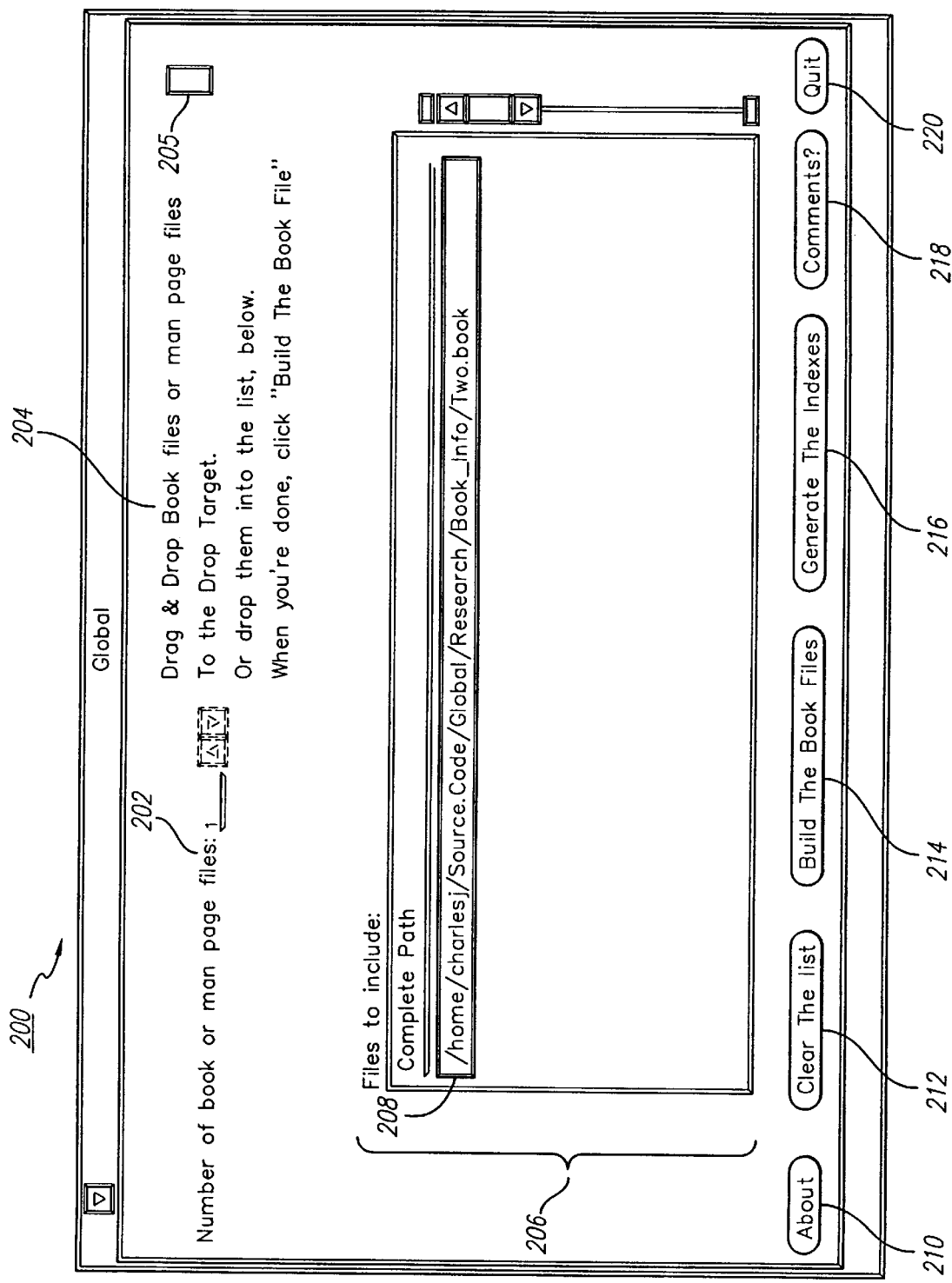
FIG. 2 shows an initial window of a global indexing software tool in accordance with a preferred embodiment of the present invention.

FIG. 2 shows an initial window 200 of global indexing software tool 130 (hereinafter "tool") displayed on display device 150. Initial widow 200 includes an area 206 that cons one or more names 208 of bookfiles. Each bookfile name 208 represents a bookfile 120. The bookfile names are dragged and dropped into area 206 by the user in a manner known to persons of ordinary skill in the art. Bookfiles also may be added to area 206 by dragging their icons into a drop target 205, as is also well-known. FIG. 2 further includes an area 202 that displays a number of bookfile names 208 in area 206 and an area 204 that displays written instructions for using tool 130.

Lastly, FIG. 2 shows a plurality of buttons, including "About" button 210; "Clear The List" button 212; "Build The Book File" button 214; "Generate The Indexes" button 216; "Comments?" button 218; and "Quit" button 220. The effect of pressing each of these buttons is discussed in connection with FIG. 5.

Figure 3:
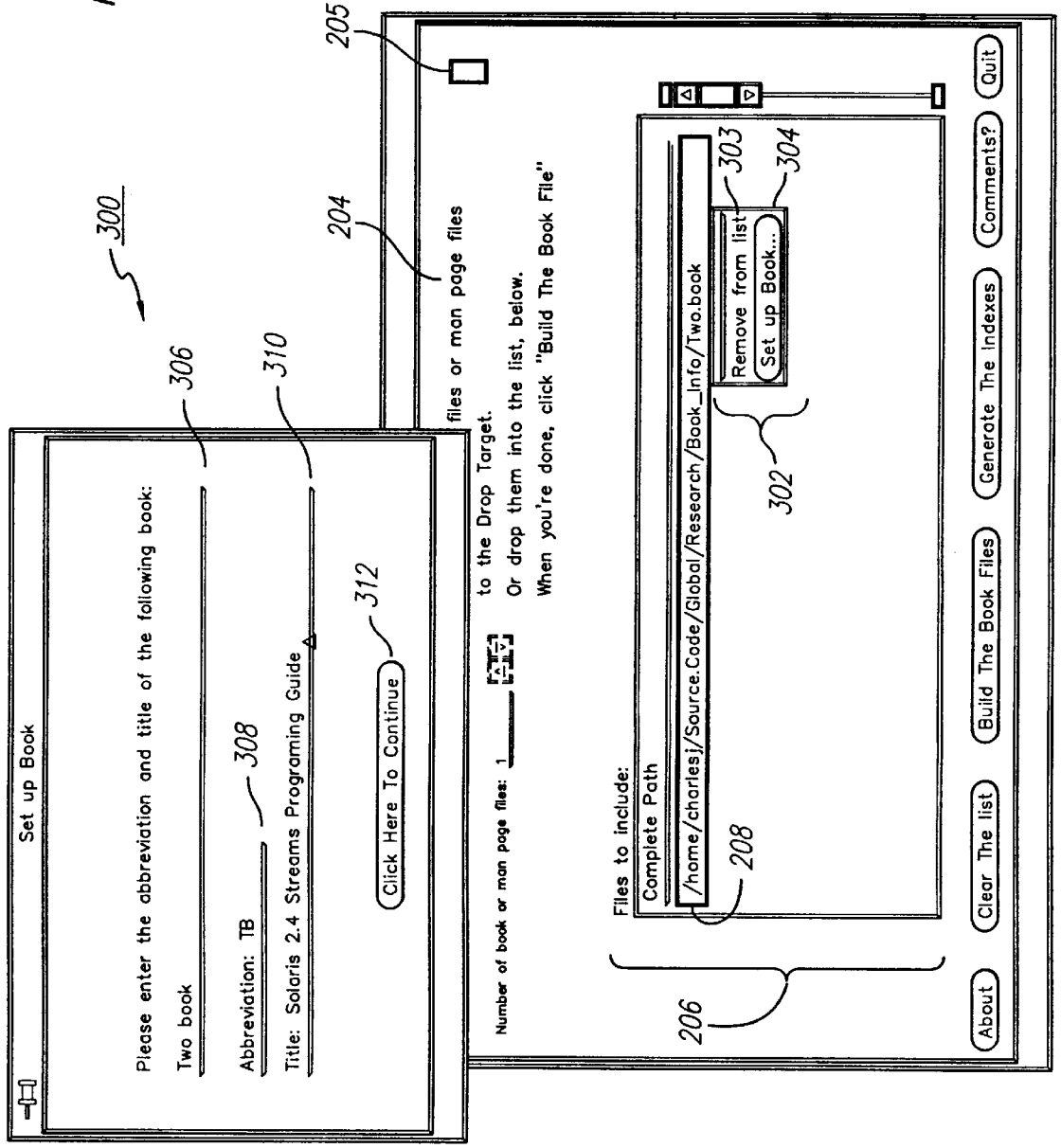
FIG. 3 shows a window of the global indenting software tool that allows the user to enter setup data for a bookfile.

FIG. 3 shows a window 300 of global indexing software tool 130 that allows the user to enter setup data for a bookfile 306. The setup data includes an abbreviation 308 for the bookfile and a long title 310 for the bookfile. The setup data is used to generate abbreviation information 402 of FIGS. 4(a) and 4(c) and title information 407 of FIG. 4(c) that is generated by tool 130.

FIGS. 4(a) and 4(b) show an example of index page 136. In FIG. 3, Window 300 is opened when the user clicks on bookfile name 208. Window 200 displays a pull-down menu 302, including the options "Remove from list" 303 and "Set up Book" 304. If the user selects "Set up Book" 304, then window 300 is opened. (If the user selects "Remove from List" 302, then the bookfile name 208 is removed from area 206 and from an internal memory representation of names 206). Clicking on button 312, closes window 300.

Figure 5:
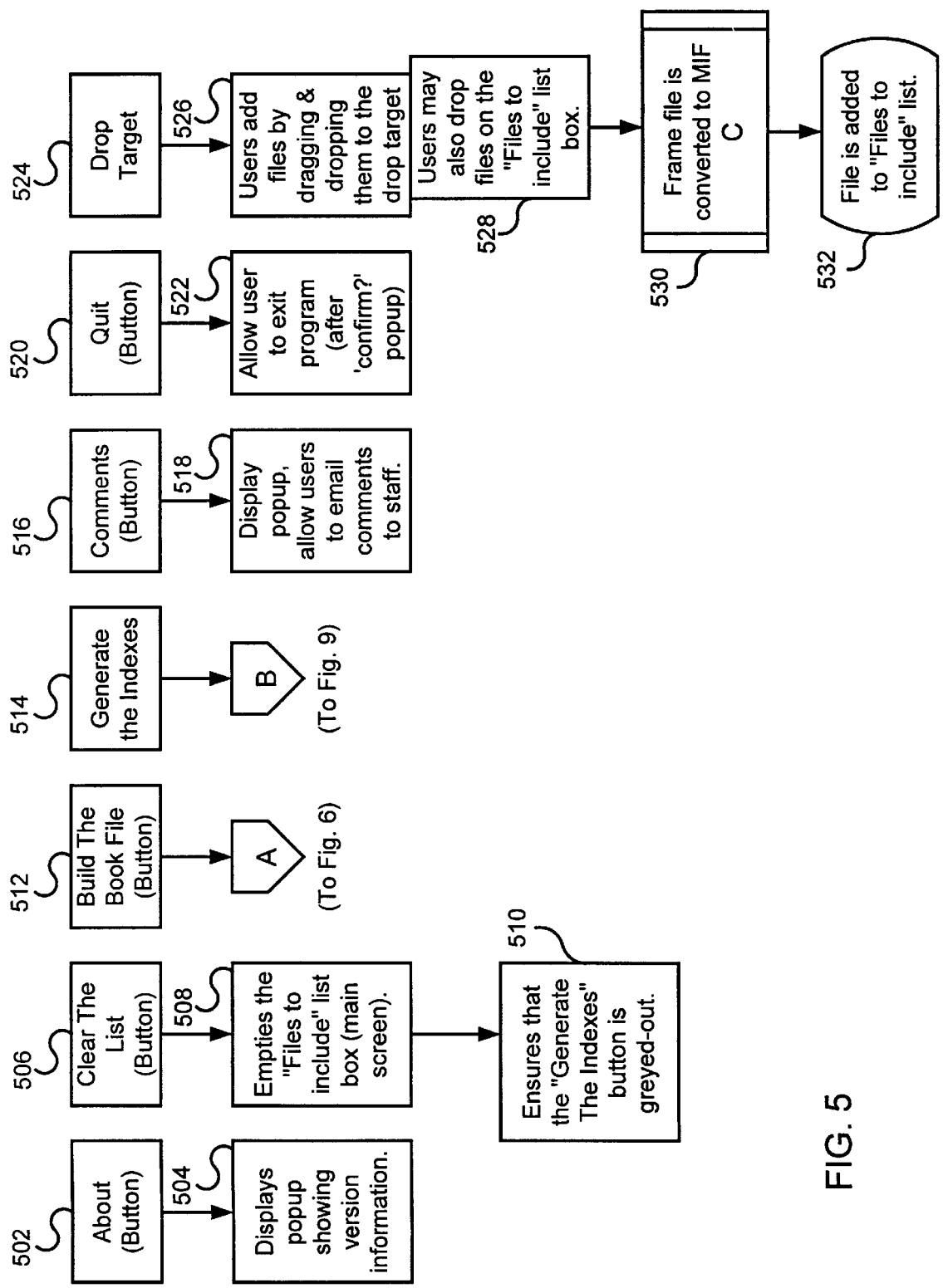
FIG. 5 is a flow chart showing steps performed by a method of a preferred embodiment of the present invention in connection with the initial window of FIG. 2.

FIG. 5 is a flow chart showing steps performed by a method of a preferred embodiment of the present invention in connection with initial window 200 of FIG. 2. It will be understood that the steps of FIG. 5 (and other flow charts in this document) represent actions performed by CPU 102 in accordance with computer instructions of software tool 130. The computer instructions can also be stored on computer readable medium 162. The following paragraphs describe the effects of pressing each button in initial window 200. When the user presses "About" button 210 in step 502, the software tool displays popup "help" information in step 504.

When the user presses "Clear The List" button 212 in step 506, the software tool empties the area 206 in step 508 and clears the internal representation in memory 104 of the bookfile names in area 206. Next, in step 510, the tool ensures that "Generate the Indexes" button 216 is greyed out. Greying out a button indicates that the button is disabled, i.e., that the user cannot press the button. (Button 216 is enabled in step 808 of FIG. 8 after a bookfile is built).

When the user presses "Build The Book File" button 214 in step 512, control passes to the steps of FIGS. 6(a) and 6(b), as described below. When the user presses "Generate The Indexes" button 216 in step 514 (and the button is not disabled), control passes to the steps of FIG. 9, as described below. Button 216 is initially disabled.

When the user presses "Comments" button 218 in step 516, tool 130 displays a popup window in step 518 that allows users to e-mail comments to staff in a manner known to persons of ordinary skill in the art.

When the user presses "Quit" button 220 in step 520, the tool displays a "Confirm?" message and, if the user enters "Yes", in step 522 exits software tool 130.

When the user drags and drops a name icon of a bookfile to the drop target 205 in step 526, or when the user drops a name icon of a bookfile in area 206 in step 528, control passes to step 530. (The user can also drop an icon for the file on the icon for the software tool before the tool is executed, as is well-known.) In step 530, if the bookfile is a binary "Maker" file, (i.e., a file format specific to Framemaker), then the file is converted to MIF ("Maker Interchange Format") format (see FIG. 10). In step 532, the filename is displayed in area 206 and added to an internal representation or list of filenames. The format of a MIF file is described in "MIF Reference," available from Framemaker Technology Corporation, published March 1993, which is herein incorporated by reference.

Figure 6A:
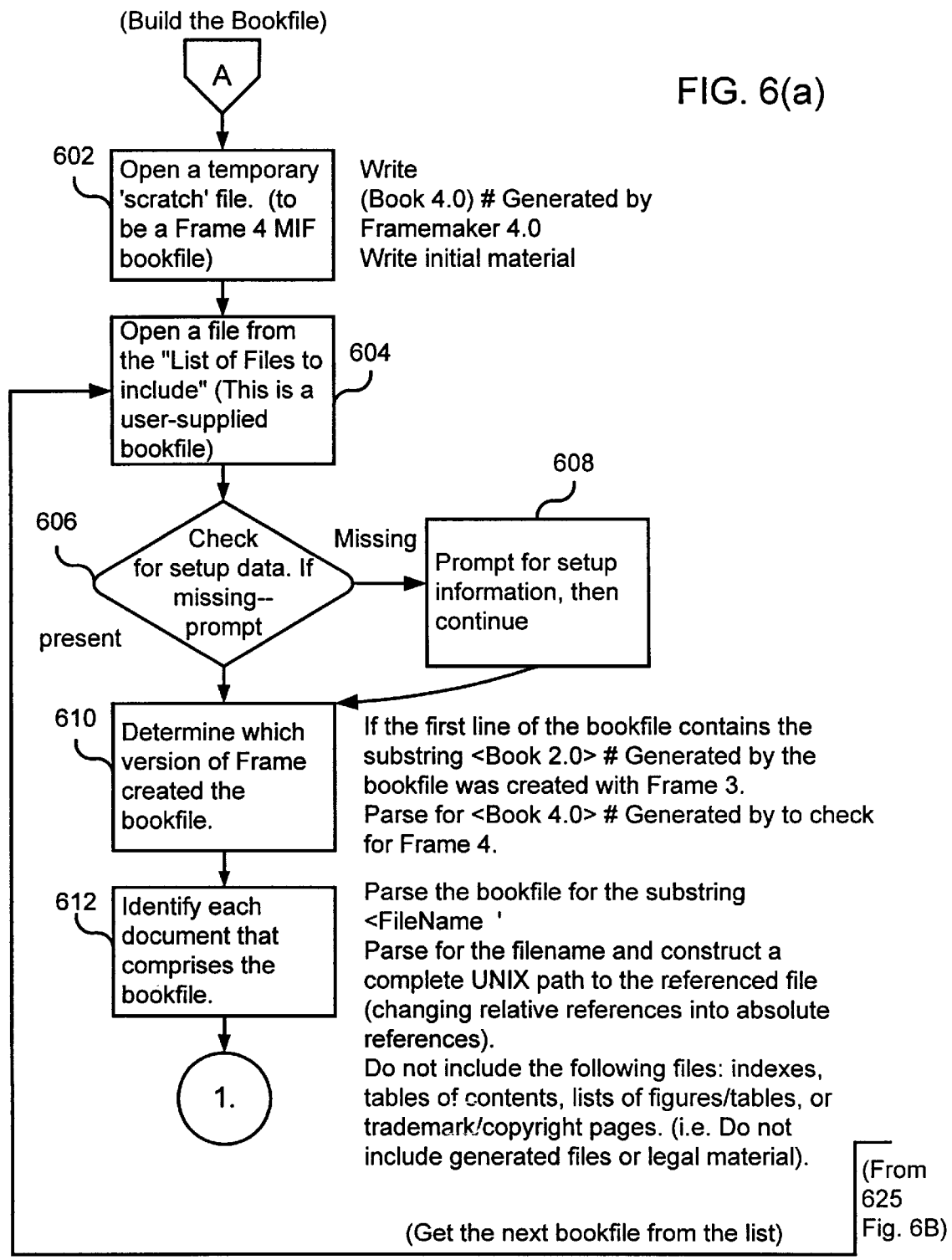
FIGS. 6 (*a*) and 6(*b*) show a flowchart including steps performed by a preferred embodiment of the present invention to build a master bookfile.
Figure 6B:
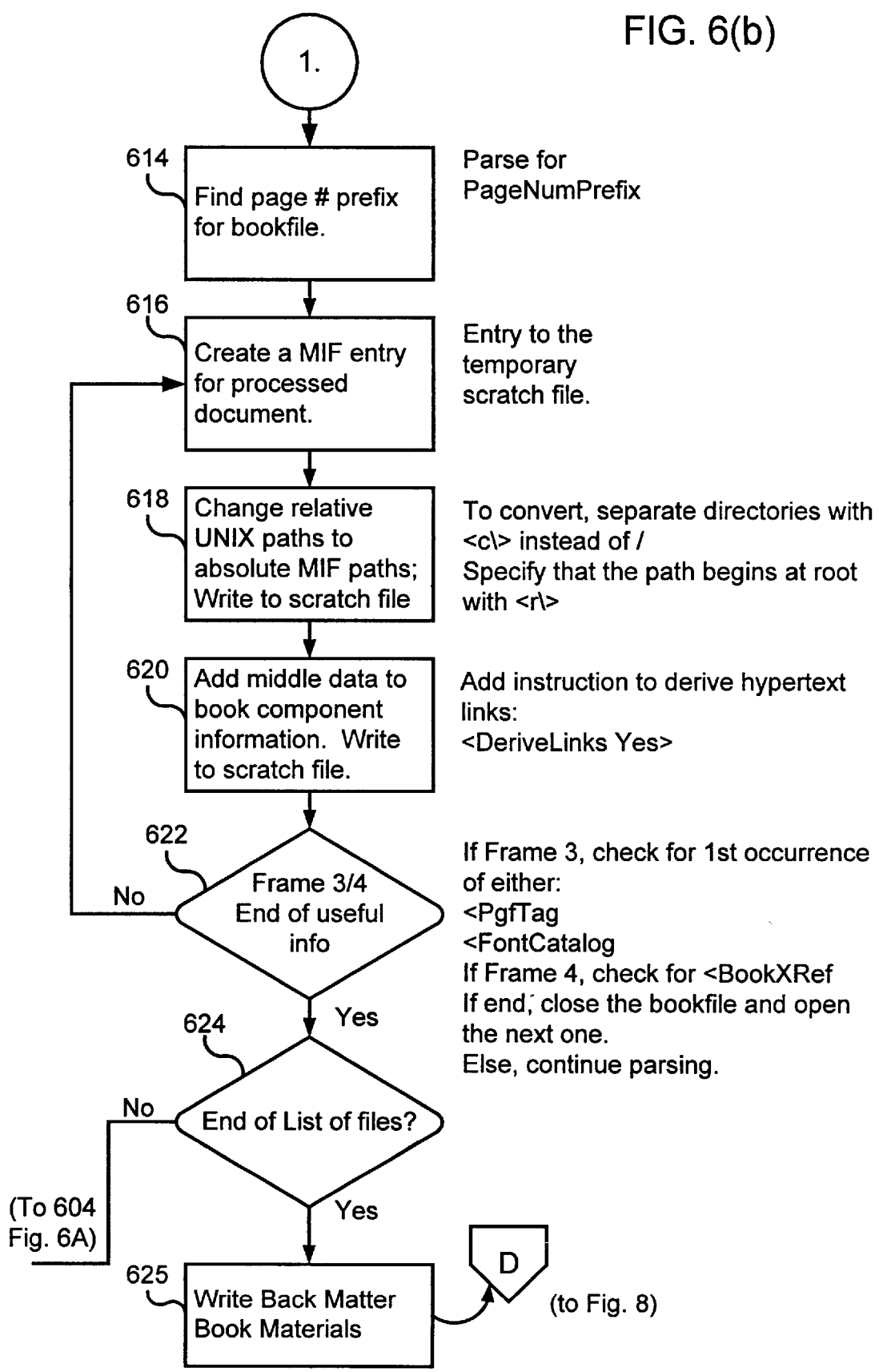

FIGS. 6(a) and 6(b) show a flow chart including steps performed by a preferred embodiment of the present invention to build master bookfile 132. In step 602, a temporary "scratch" file is opened on a disk or a similar storage medium. This scratch file will eventually hold master bookfile 132 of FIG. 1, which is generated in accordance with the bookfiles listed in area 206. Because the master bookfile 132 is preferably a MIF file of the format output by Framemaker version 4.0, the first line written to the scratch file (by tool 130) is:

<Book 4.0 # Generated by FrameMaker 4.0 The tool also writes predefined initial material to the scratch file. An example of computer code to generate the initial material is shown in FIG. 12. The initial material is written to the scratch file once.

Steps 604 through 624 form a loop that is repeated for each bookfile listed in area 206. In step 604, tool 130 opens a next bookfile (hereinafter "the current bookfile"). In step 606, the tool checks whether setup data for the current bookfile have been entered by the user. If no setup data have been entered, tool 130 displays the window of FIG. 3 and allows the user to enter setup information in step 608. Thus, in the described embodiment, each bookfile 120 will have an associated abbreviation and a long title.

In step 610, the tool determines which version of FrameMaker created the current bookfile. If the first line of the current bookfile contains the substring "<Book 2.0 # Generated by" then the current bookfile was created by FrameMaker 3.0. If the first line of the current bookfile contains the substring "<Book 4.0 # Generated by" then the current bookfile was created by FrameMaker 4.0. Step 610 sets a version flag in memory 104 indicating whether the current bookfile is version 3.0 or 4.0.

In step 612, the tool identifies each document that is referenced by the current bookfile. This is done by parsing the current bookfile for all occurrences of the substring "<FileName fn", where fn is a relative pathname. Once a filename of a document is found, the tool parses the filename and constructs an absolute Unix filename path for the referenced file. During the construction of the absolute filename path, relative references in the filename are changed to absolute references. For example, the relative reference "file1" (stored in the root directory) is changed to absolute reference "<r\><c\>file1" as described in "MIF Reference," discussed above (see also FIG. 15). Unix is a registered trademark in the United States and other countries, exclusively licensed through X/Open Co. Limited.

Figures 15, 16:
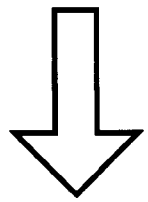
FIG. 15 shows an example of filename conversion.
FIG. 16 shows an example of a map file.

FIG. 15 shows an example of conversion between a file name, such as would be in bookfile 120 or 120A, and a MIF version of an absolute Unix pathname, such as would be in master bookfile 132. As shown in FIG. 15, an absolute pathname includes all possible levels of the file hierarchy.

When tool 130 is forming the list of filenames referenced in a bookfile in step 612, it excludes certain types of files that are not relevant to indexing. For example indexes, tables of contents, lists of figures and tables, and legal matters, such as trademark/copyright pages are not included in the list of files. These excluded types of files preferably are detected by their filenames as follows ("*" is a wildcard):

| Filename | Type of File |
| --- | --- |
| *Ix.doc | index |
| *TOC.doc | table of contents |
| *LOF.DOC | list of figures |
| *LOT.doc | list of tables |
| *redits.doc | credits (legal matter) (upper or lower case) |

In step 614, the tool parses the current bookfile to find a page number prefix for the bookfile. A example of a page number prefix is shown as element 408 in FIG. 4(a). The prefix is used, for example, to indicate a chapter number or an Appendix name as part of a page number.

Steps 616 through 622 form a loop performed for each document referenced by the current bookfile (except for the documents excluded in step 612). In step 616, a MIF entry is created for the current document and written to the scratch file. To create a MIF entry, tool 130 converts the absolute Unix pathname from step 612 to an absolute MIF pathname. Tool 130 then writes the following lines to the scratch fie:

<BookComponent

<Filename fn> where "fn" is the absolute MIF filename (from step 618).

In step 620, tool 130 writes "middle data" for the current document to the scratch file. An example of computer code to generate middle data is shown in FIG. 13. The middle data is generated once for each document in the bookfile. If the current document is the first document referenced in the scratch file then tool 130 writes:

<PgfNumbering Restart > If the current document is not the first document in the scratch file, then tool 130 writes:

<PgfNumbering Continue > The tool also writes (see lines 1304 of FIG. 13):

<DeriveLinks Yes> (see line 1302). "DeriveLinks" is a feature of FrameMaker 4.0 (not FrameMaker 3.0) and indicates that the Framemaker word processor should derive hypertext links.

Step 622 determines whether the end of useful information of the current bookfile has been reached. The end of a bookfile is specified differently in the FrameMaker 3.0 and FrameMaker 4.0 versions. If the version flag indicates that the current bookfile is of version FrameMaker 3.0, then the tool looks for either:

<PgfTag or

<FontCatalog If the version flag indicates that the current bookfile is of version FrameMaker 4.0, then the tool looks for:

<BookXref

It should be understood that the current bookfile may contain other data after the "PgfTag", "FontCatalog", or "BookXref" lines, but this data is not needed to generate the scratch file, and is ignored. If the current bookfile has been processed and there are more bookfiles, then control passes to step 604. Otherwise, the end of all the bookfiles has been reached and tool 130 writes predefined "back-matter book material" to the scratch file in step 625. FIGS. 14(a) and 14(b) show in example of computer code to generate back-matter book material. Tool 130 writes back-matter book material into the scratch file once. After the back-matter book material has been written, control passes to FIG. 8.

Figure 8:
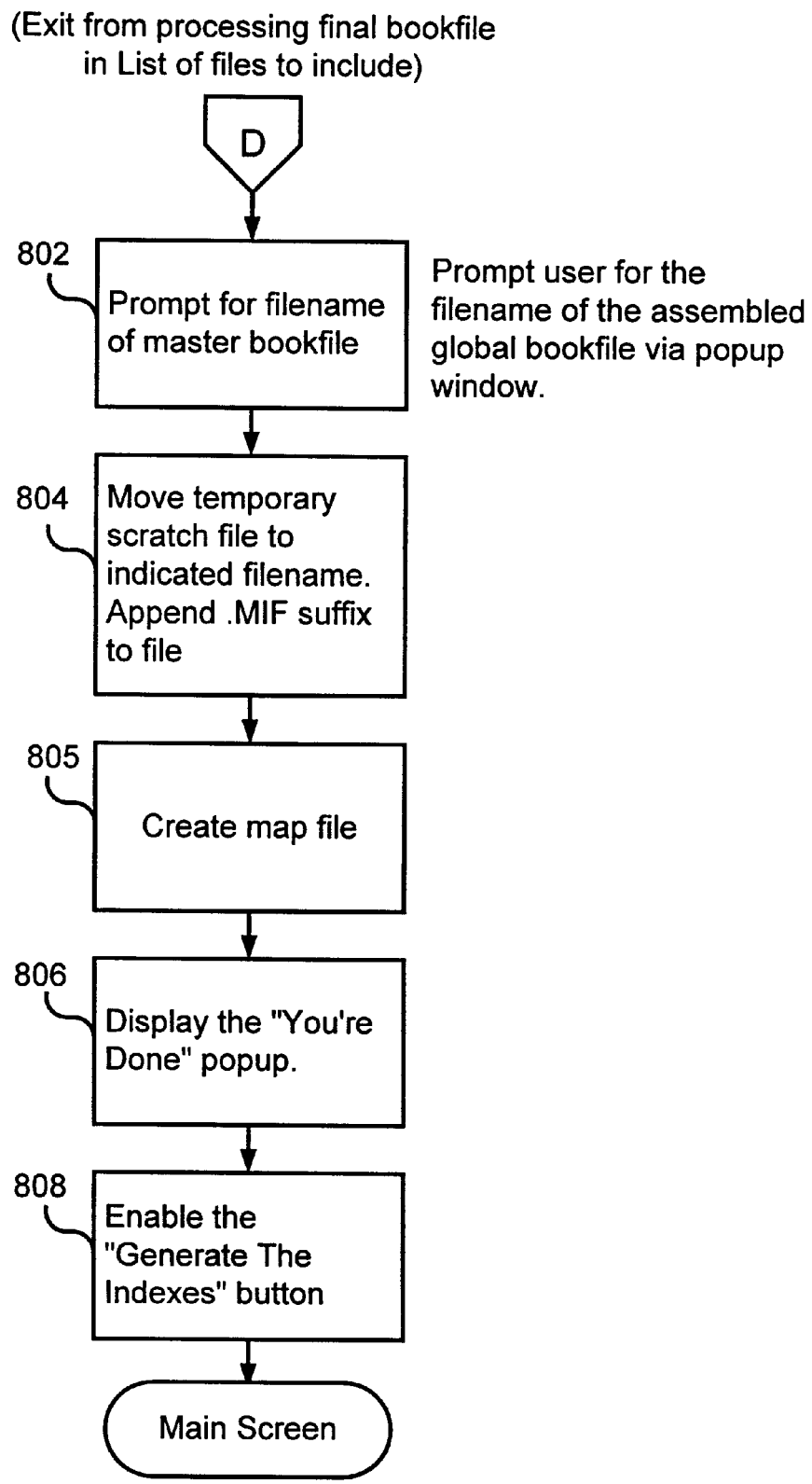
FIG. 8 is a flow chart showing further steps performed by a preferred embodiment of the present invention after the master bookfile has been built.

FIG. 8 is a flow chart showing further steps performed by a preferred embodiment of the present invention after the scratch file has been built. In step 802, tool 130 opens window 700 of FIG. 7 and allows the user to enter the name of the master bookfile 132. An area 702 indicates the total number of documents represented in the scratch file. The user enters a filename in area 704. If the user presses "Save" button 706, the filename is saved and will be used as the bookfile 132 name. If the user presses "Cancel" button 708, the software tool closes the window, but does not save the bookfile name. In step 804, the scratch file is copied to the newly opened master bookfile 132.

In step 805, a "map file" is created. This file has the filename specified by the user in area 704, but instead of the suffix ".mif" it has the suffix ".map" FIG. 16 shows an example of a map file having entries for a first bookfile having the abbreviation "TB" and the title "Solaris 2.4 Streams Programming Guide" (see FIG. 3) and for a second bookfile having the abbreviation "GDOC" and the title "General Documentation". Thus, the map file has an entry for each bookfile whose name appears in area 206. The map file is used during the indexing operation to create a "Key to Abbreviations" page, such as that shown in FIG. 4(c). Step 806 displays a "You're Done" message in window 200. Step 808 enables ("ungreys") "Generate The Indexes" button 216.

Figure 9:
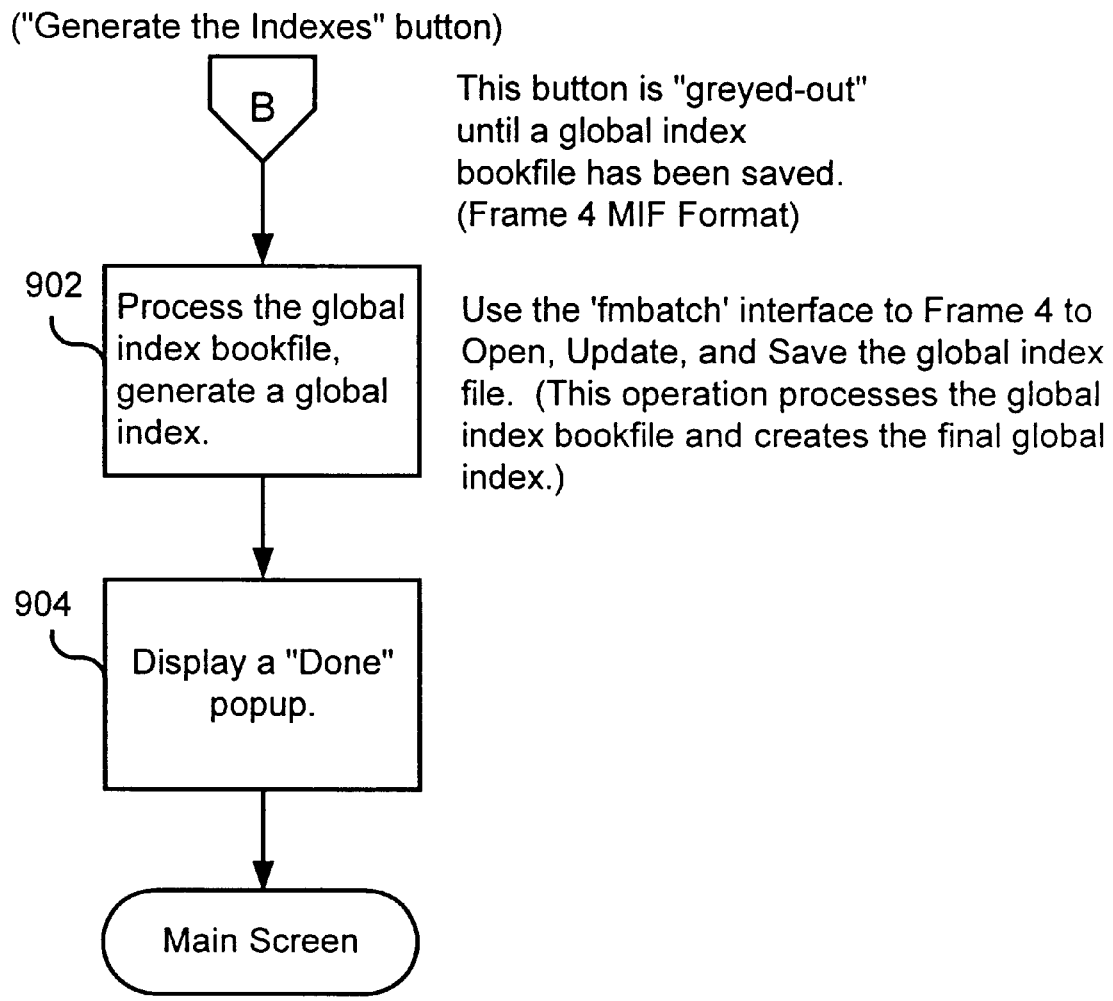
FIG. 9 is a flow chart showing steps performed by a preferred embodiment of the present invention to generate one or more index pages from the master bookfile.

FIG. 9 is a flow chart showing steps performed by a preferred embodiment of the present invention to generate one or more index pages from master bookfile 132. The steps of FIG. 9 are performed when the user presses "Generate The Indexes" button 218. (This button is disabled until master bookfile 132 has been created). In step 902, the tool accesses the FrameMaker 4.0 software and uses a feature of FrameMaker 4.0 called the "fmbatch interface" to Open, Update, and Save master bookfile 132. This operation processes master bookfile 132 and creates one or more global index pages 136. Step 904 displays a "Done" message in window 200. Note that the interface between tool 130 and FrameMaker 4.0 is completely transparent to the user.

Figure 10:
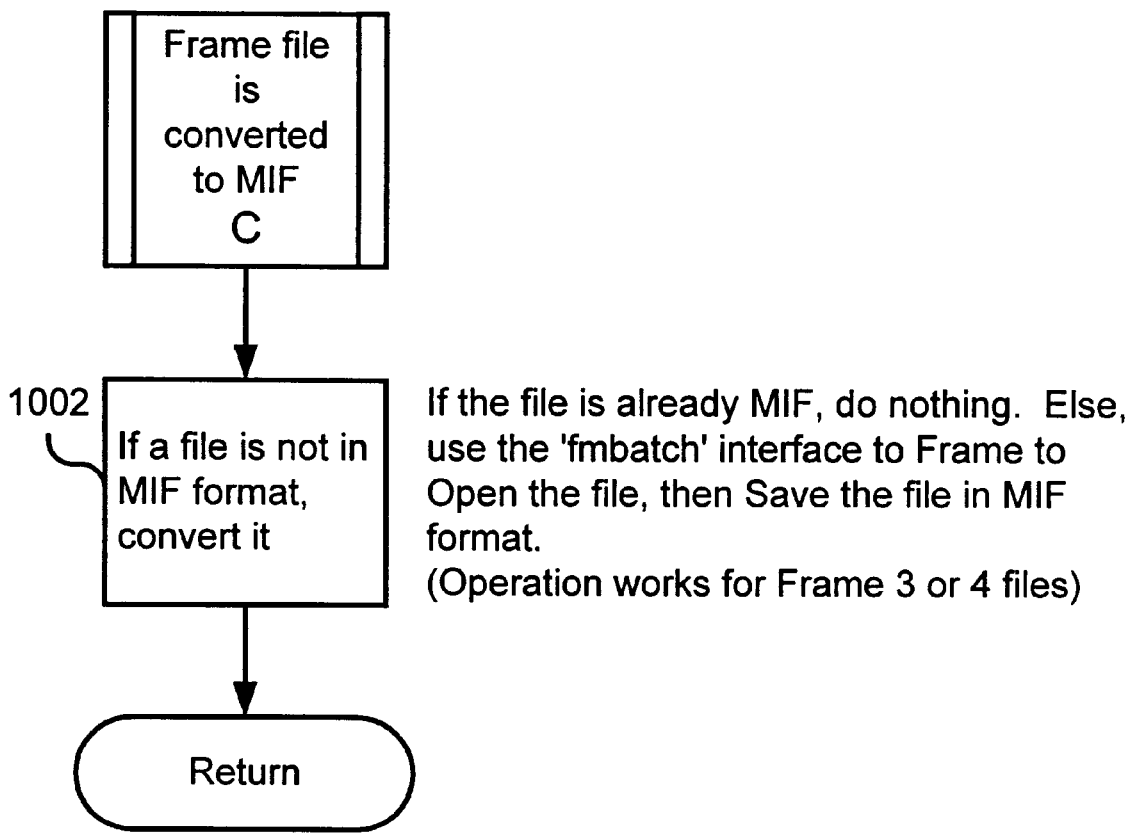
FIG. 10 is a flow chart showing steps performed by a preferred embodiment of the present invention to convert a first file format to a second file format.

FIG. 10 is a flow chart showing steps performed by a preferred embodiment of the present invention to convert a Maker file to MIF format. In step 1002, if the file is already in MIF format, the tool does not perform further conversion processing. Otherwise, the tool interfaces with the Frame-Maker 4.0 software via the fmbatch interface of Frame-Maker 4.0 to Open the file and to then save the file in MIF format. This conversion operation works for both Frame-Maker 3.0 and Framemaker 4.0 files.

Figure 11B:
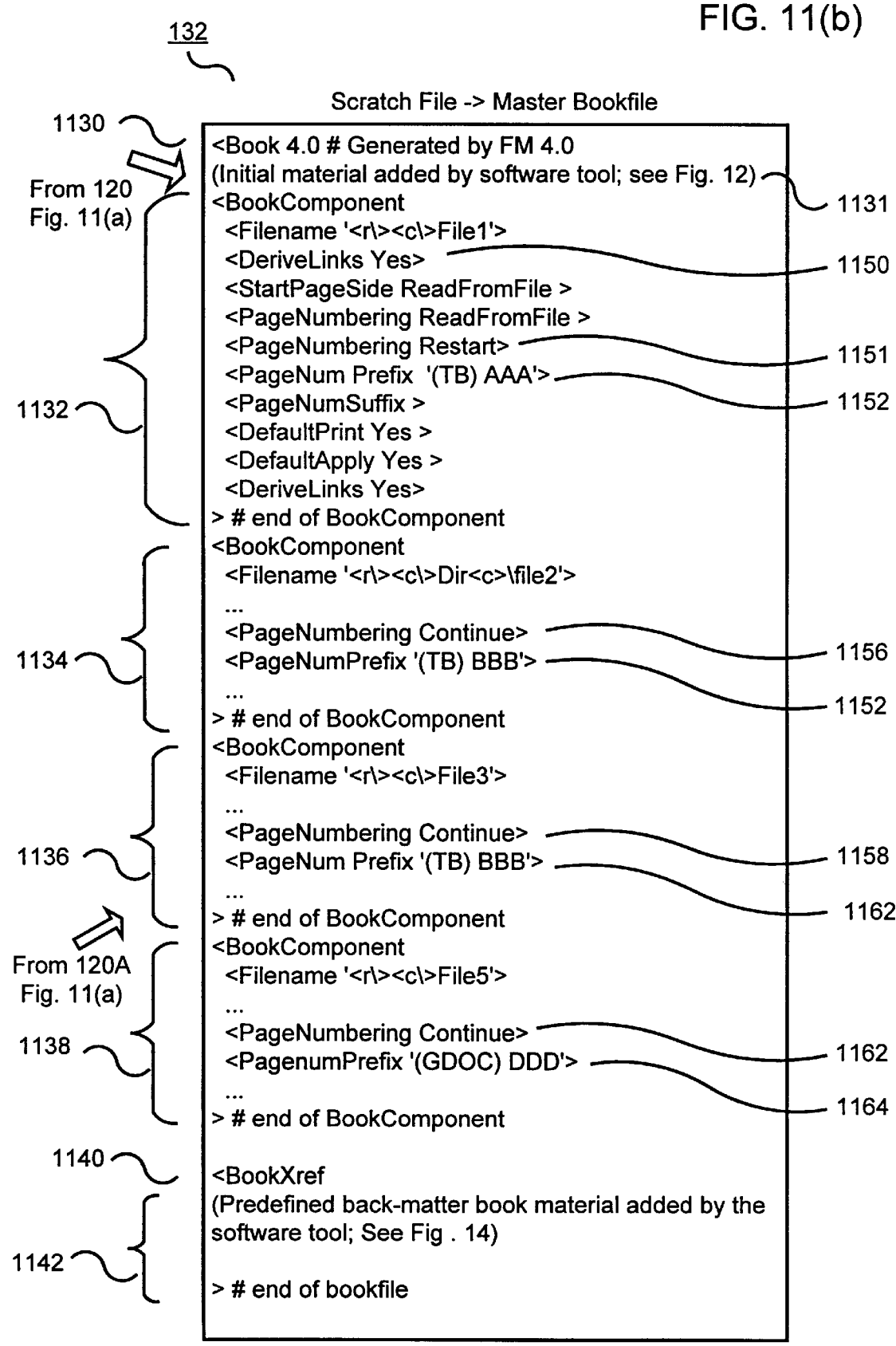
FIG. 11 (*a*) shows an example of two bookfiles.

FIG. 11(a) shows an example of two bookfiles 120, 120A having mixed formats/versions, and FIG. 11(b) shows the resulting master bookfile 132 generated by tool 130. The first bookfile 120 is a FrameMaker 4.0 file (line 1101) that references documents File1, File2, and File3 (lines 1102, 1104, and 1106, respectively). The second bookfile 120A is a FrameMaker 3.0 file (line 1112) and references documents File4 and File5 (lines 1114 and 1116, respectively). Because the first bookfile 120 is a FrameMaker 4.0 file, its document references are ended by a "Book XRef" line 1108. Because the second bookfile 120A is a FrameMaker 3.0 file, its document references are ended by a "PgfTag" line 1118. Lines 1110 and 1120 in both bookfiles are ignored.

Master bookfile 132 is a FrameMaker 4.0 file (line 1130) and contains initial material 1131. Master bookfile 132 references four documents (lines 1132, 1134, 1136, and 1138). Note that "File4" is not referenced in master bookfile 132 because it is a table of contents file (lines 1114). Because master bookfile 132 is a FrameMaker 4.0 file, its documents are ended by a "Book XRef" line 1140, followed by back-matter book material 1142. Each document has a "DeriveLinks Yes" line (some not shown).

Documents in master bookfile 132 that were originally referenced in a FrameMaker 4.0 file may include a "DeriveLinks Yes" line (lines 1150, 1154, 1158). The first document referenced has a "PageNumbering Restart" line (line 1151) and all other documents have a "PageNumbering Continue" line (line 1156, 1158, 1162). References to File1, File2, and File3 include a "PageNum Prefix" of "TB" 1152 because that is the abbreviation of the first bookfile 120. File5 includes a "PageNum Prefix" of "GDOC" 1164 because that is the abbreviation of the second bookfile 120A. This second abbreviation, along with a second long title ("General Documentation") were entered using the window 300 of FIG. 3 (not shown). After it is created, master bookfile 132 is indexed in accordance with FIG. 9.

In summary, the present invention provides a software tool for global indexing. The user can drag and drop filenames of bookfiles into the tool. Each of the bookfiles contains one or more documents, each document containing its own indexing information. Each document may or may not be in a desirable format and/or version. The software tool of a preferred embodiment of the present invention converts the documents to a desirable format and combines them into a master bookfile, which has the format of the desirable version (e.g., FrameMaker 4.0). The tool then uses framemaker to generate one or more index pages from the master bookfile. A preferred embodiment of the present invention also allows the user to specify abbreviations and long titles to use for each bookfile.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A software tool executable on a processing unit for globally indexing a master bookfile where the master bookfile includes at least one bookfile of a first version of a word processing program and at least one bookfile of a second version of a word processing program and where each bookfile references a plurality of documents, the software tool comprising:

an input portion configured to receive a name of the at least one bookfile in the first version of the word processing program and a name of the at least one bookfile in the second version of the word processing program from the user of the software tool;

an initial portion configured to write initial computer readable data to a scratch file, specifying that the master bookfile be formatted according to the second version of the word processing program;

a middle portion configured to write computer readable data to the scratch file for each document in accordance with the first version of the word processing program of the bookfile and in accordance with the second version of the word processing program of the bookfile;

an ending portion configured to write back-matter book material in the form of computer readable data to the scratch file;

a copying portion configured to copy the scratch file to the master bookfile; and an indexing portion configured to index the master bookfile to generate a global index page.

2. The software tool of claim 1, further including:

a portion configured to input from the user an abbreviation for the bookfile, where the middle portion writes the abbreviation for the bookfile to the master bookfile.

3. The software tool of claim 2, wherein the indexing portion generates a page number in accordance with the abbreviation for the bookfile.

4. The software tool of claim 1, further including:
a portion configured to input from the user a long title for the bookfile,
where the middle portion writes the long title for the bookfile to the master bookfile.

5. The software tool of claim 4, wherein the indexing portion generates an index page in accordance with the long title for the bookfile.

6. The software tool of claim 1, where the middle portion writes "<Derive Links Yes>" to the master bookfile for each document.

7. The software tool of claim 1, where the middle portion writes an initial page numbering string to the master bookfile for a first document of the plurality of documents, and where the middle portion writes a "continue" page numbering string to the master bookfile for all other documents of the plurality of documents.

8. The software tool of claim 1, where the middle portion converts an relative filename to an absolute filename.

9. The software tool of claim 1, wherein the first version is FrameMaker 3.0.

10. The software tool of claim 1, wherein the second version is FrameMaker 4.0.

11. The software tool of claim 1,
wherein the software tool initiates global indexing of a first and a second bookfile, wherein each of the first and second bookfiles reference a plurality of documents, the first bookfile having a first file format and the second bookfile having a second file format,
wherein the input portion receives the name of the first and second bookfiles from the user,
wherein the middle portion writes material to the master bookfile for each document in the first bookfile in accordance with the format of the first bookfile, and
wherein the middle portion writes material to the master bookfile for each document in the second bookfile in accordance with the format of the second bookfile.

12. The software tool of claim 1, further including:
a portion configured to input from the user an abbreviation for the bookfile,
where the ending portion writes the abbreviation for the bookfile to a map file.

13. The software tool of claim 1, further including:
a portion configured to input from the user a long title for the bookfile,
where the ending portion writes the long title for the bookfile to a map file.

14. A method for globally indexing a master bookfile where the master bookfile includes at least one bookfile of a first version of a word processing program and at least one bookfile of a second version of a word processing program and where at least one bookfile references a plurality of documents, where a data processing system performs steps comprising of:
receiving a name of the at least one bookfile in the first version of the word processing program and a name of the at least one bookfile in the second version of the word processing program from the user;
writing initial computer readable data to a scratch file;
specifying that the master bookfile be formatted according to the second version of the word processing program;
writing middle computer readable data to a scratch file for each document in accordance with the first version of the word processing program of the bookfile and in accordance with the second version of the word processing program of the bookfile;
writing back-matter book material in the form of computer readable data to the master bookfile;
copying the scratch file to a master bookfile; and
indexing the master bookfile to generate a global index page.

15. The method of claim 14 further including the steps of:
inputting from the user an abbreviation for the bookfile,
where the middle writing step includes the step of writing the abbreviation for the bookfile to the master bookfile.

16. The method of claim 15, wherein the indexing step includes the step of generating a page number in accordance with the abbreviation for the bookfile.

17. The method of claim 14, further including the steps of:
inputting from the user a long title for the bookfile,
where the middle writing includes the step of writing the long title for the bookfile to the master bookfile.

18. A computer-readable medium carrying one or more sequences of instructions for globally indexing a bookfile in the form of computer readable data created using a first version or a second version of a computer software word processing program, where the bookfile references a plurality of documents and the bookfile is stored in accordance with a format of the first version or the second version of the word processing program, wherein execution of the one or more sequences of instructions by one or more processors causes the one or more processors to perform the steps of:
receiving the name of the bookfile from the user;
writing initial material in the form of computer readable data to a master bookfile, specifying that the master bookfile is formatted according to the second version of the word processing program;
writing middle material in the form of computer readable data to the master bookfile for each document in accordance with the version of the word processing program of the bookfile;
writing back-matter book material in the form of computer readable data to the master bookfile; and
indexing the master bookfile to generate a global index page.

19. The computer readable medium according to claim 18, wherein execution of the one or more sequences of instructions by one or more processors causes the one or more processors to perform the additional steps of:
inputting from the user an abbreviation for the bookfile,
where the middle writing step includes the step of writing the abbreviation for the bookfile to the master bookfile.

20. A computer program comprising:
a computer usable medium having computer readable code embodied therein for causing global indexing of a masterfile where the master bookfile includes at least one bookfile of a first version of a word processing program and at least one bookfile references a plurality of documents, the computer program product including:
computer readable program code devices configured to cause a computer to effect receiving a name of the at least one bookfile in the first version of the word processing program and the at least one bookfile in the second version of the word processing program from the user;

computer readable program code devices configured to cause a computer to effect writing initial computer readable data to a scratch file;

computer readable program code devices configured to cause a computer to effect specifying that the master bookfile be formatted according to the second version of the word processing program;

computer readable program code devices configured to cause a computer to effect; and computer readable program code devices configured to cause a computer to effect writing middle computer readable data to a scratch file for each document in accordance with the first version of the word processing program of the bookfile.

* * * * *